(12) United States Patent
Campbell et al.

(10) Patent No.: US 10,527,717 B2
(45) Date of Patent: Jan. 7, 2020

(54) BINARY PHASE SHIFT KEYING (BPSK) ON ORTHOGONAL CARRIERS FOR MULTI-CHANNEL IM-CW CO2 ABSORPTION OR LIDAR/RADAR/SONAR MAPPING APPLICATIONS

(71) Applicant: U.S.A. as represented by the Administrator of the National Aeronautics and Space Administration, Washington, DC (US)

(72) Inventors: Joel F. Campbell, Poquoson, VA (US); Bing Lin, Yorktown, VA (US); Amin R. Nehrir, Yorktown, VA (US)

(73) Assignee: UNITED STATES OF AMERICA AS REPRESENTED BY THE ADMINISTRATOR OF NASA, Washington, DC (US)

(*) Notice: Subject to any disclaimer, the term of this patent is extended or adjusted under 35 U.S.C. 154(b) by 738 days.

(21) Appl. No.: 14/817,843

(22) Filed: Aug. 4, 2015

(65) Prior Publication Data
US 2017/0038464 A1  Feb. 9, 2017

Related U.S. Application Data

(60) Provisional application No. 62/052,608, filed on Sep. 19, 2014.

(51) Int. Cl.
*G01S 13/32* (2006.01)
*G01S 17/32* (2006.01)
(Continued)

(52) U.S. Cl.
CPC ............ *G01S 13/325* (2013.01); *G01S 13/95* (2013.01); *G01S 17/32* (2013.01); *G01S 17/95* (2013.01);
(Continued)

(58) Field of Classification Search
CPC ...... G01S 13/325; G01S 13/95; G01S 15/325; G01S 17/32; G01S 17/95
(Continued)

(56) References Cited

U.S. PATENT DOCUMENTS 3,889,261 A * 6/1975 Sirven .................... G01S 13/08
342/127
4,901,082 A   2/1990 Schreiber et al.
(Continued)

OTHER PUBLICATIONS

Waves of differing frequency are orthogonal—help me understand, Jan. 2014, math.stackexchange.com (Year: 2014).*
(Continued)

*Primary Examiner* — Timothy A Brainard
(74) *Attorney, Agent, or Firm* — M. Bruce Harper; Jonathan B. Soike; Robin W. Edwards

(57) ABSTRACT

Systems, methods, and devices of the present invention use a single Pseudo Noise (PN) code to modulate multiple orthogonal carriers by Binary Phase Shift Keying (BPSK) modulation. The various embodiments enable closely spaced carriers to be modulated with the same periodic PN sequence using BPSK modulation. In this manner, even though the carriers may almost entirely share bandwidth, orthogonality of the carriers may not be lost, enabling the various embodiments to be used with limited bandwidth Intensity Modulated Continuous Wave (IM-CW) Light detection and ranging (Lidar), Radio detection and ranging (Radar), or Sound Navigation and Ranging (Sonar) systems. Additionally, by using orthogonal carriers the various embodiments enable measurements to be made simultaneously, thereby reducing the error compared to systems that require sequential measurements, such as pulsed Lidar systems.

15 Claims, 6 Drawing Sheets

(51) Int. Cl.
*G01S 17/95* (2006.01)
*G01S 13/95* (2006.01)
*G01S 15/32* (2006.01)

(52) U.S. Cl.
CPC ............. *G01S 15/325* (2013.01); *Y02A 90/18* (2018.01); *Y02A 90/19* (2018.01)

(58) Field of Classification Search
USPC .......................................................... 342/131
See application file for complete search history.

(56) References Cited

U.S. PATENT DOCUMENTS

| | | | |
|---|---|---|---|
| 5,177,691 A | 1/1993 | Wells et al. | |
| 6,157,341 A | 12/2000 | Silvestrin et al. | |
| 6,311,043 B1* | 10/2001 | Haardt ................. | H04B 7/0854 342/378 |
| 6,967,607 B2 | 11/2005 | Melanson | |
| 7,289,049 B1 | 10/2007 | Fudge et al. | |
| 7,359,057 B2 | 4/2008 | Schwiesow | |
| 7,361,922 B2 | 4/2008 | Kameyama et al. | |
| 7,616,888 B2 | 11/2009 | Mendenhall et al. | |
| 7,995,917 B2 | 8/2011 | Mendenhall et al. | |
| 8,605,262 B2 | 12/2013 | Campbell et al. | |
| 9,097,646 B1 | 8/2015 | Campbell et al. | |
| 2007/0008534 A1 | 1/2007 | Lo et al. | |
| 2009/0073025 A1* | 3/2009 | Inoue .................... | G01S 13/325 342/70 |
| 2009/0153394 A1 | 6/2009 | Navarro et al. | |
| 2010/0208231 A1 | 8/2010 | Murai | |
| 2011/0129023 A1 | 6/2011 | Hoffmann et al. | |
| 2011/0279307 A1* | 11/2011 | Song ....................... | G01S 7/292 342/132 |
| 2013/0342836 A1 | 12/2013 | Newbury et al. | |

OTHER PUBLICATIONS

National Research Council, "Earth Science and Applications from Space: National Imperatives for the Next Decade and Beyond," The National Academies Press, 2007, pp. 1-88 Washington, D.C.

Koch, Grady J. et al., "Coherent Differential Absoption Lidar Measurements of CO2," Applied Optics, Sep. 10, 2004, pp. 5092-5099, vol. 43, No. 26.

Abshire, James B. et al., "Pulsed Airborne Lidar Measurements of Atmospheric CO2 Column Absorption," 8th International Carbon Dioxide Conference, ICDC8, Sep. 13-19, 2009, pp. 770-783, vol. 62, Telius, B. Germany.

Kameyama, Shumpei et al., "Feasibility Study on 1.6 um Continuous-wave Modulation Laser Absorption Spectrometer System for Measurement of global CO2 Concentration from a Satellite," Applied Optics, May 10, 2011, pp. 2055-2068, vol. 50, No. 14.

Campbell, Joel F. et al., "Pseudorandom Noise Code-based Technique for Thin-cloud Discrimination with CO2 and O2 absorption Measurements," Optical Engineering. Dec. 2011, pp. 126002-1-126002-8, vol. 50, No. 12.

Campbell, Joel F. et al., "A Low Cost Remote Sensing System Using PC and Stereo Equipment," Am. J. Phys., Dec. 2011, pp. 1240-1245, vol. 79, No. 12.

Agishev, R. et al., "Atmospheric CW-FM-LD-RR Ladar for Trace-constituent Detection: A Concept Development," Appl. Phy. B, 2005, pp. 695-703, vol. 81.

Batet, Oscar et al., "Intensity-modulated Linear-frequency-modulated Continuous-wave Lidar for Distributed Media: Fundamentals of Technique," Applied Optics, Jun. 10, 2010, pp. 3369-3379, vol. 49, No. 17.

Imaki, Masaharu et al., "Laser Absorption Spectrometer Using Frequency Chirped Intensity Modulation at 1.57 um Wavelength for CO2 Measurement," Optics Letters, Jul. 1, 2012, pp. 2688-2690, vol. 37, No. 13.

Browell, Edward V. et, al., Airborne Laser CO2 Column Measurements: Evaluation of Precision and Accuracy Under Wide Range of Conditions, Presented at Fall AGU Meeting, Dec. 5-9, 2011, pp. 1-17, San Francisco, CA.

Browell, Edward V. et al., "Airborne Validation of Laser CO2 and O2 Column Measurements," 16th Symposium on Meteorological Observation and Instrumentation, 92nd AMS Annual Meeting, Jan. 22-26, 2012, New Orleans, LA.

Dobler, Jeremy T. et al., "Atmospheric CO2 Column Measurements with an Airborne Intensity-modulated Continuous Wave 1.57 um Fiber Laser Lidar," Applied Optics, Apr. 20, 2013, pp. 2874-2892, vol. 52, No. 12.

Songsheng, Chen, et al., "Digital Lock-in Detection for Multiple-frequency Intensity-modulated Continuous Wave Lidar," Jun. 25-29, 2012, 26th International Laser Radar Conference, SIP-38, Port Heli, Greece.

Dobbs, Michael et al., "Matched Filter Enhanced Fiber-based Lidar for Earth,Weather and Exploration", NASA ESTO Conference, Jun. 2006, pp. 1-6.

Dobbs, Michael et al., "A Modulated CW Fiber Laser-Lidar Suite for the ASCENDS Mission," Proc. 24th International Laser Radar Conference, Jul. 24-29, 2008, Boulder, CO.

Dober, Jeremy T. et al., "Advancements in a Multifunctional Fiber Laser Lidar for Measuring Atmospheric CO2 and O2," 16th Symposium on Meteorological Observation and Instrumentation, 92nd AMS Annual Meeting. Jan. 22-26, 2012, New Orleans, LA. (Abstract Submitted Herwith).

Campbell, Joel F., "Nonlinear Swept Frequency Technique for CO2 Measurements Using a CW Laser System," Applied Optics, May 1, 2013, pp. 3100-3107, vol. 52, No. 13.

Campbell, Joel, "Synthetic Quadrature Phase Detector/demodulator for Fourier Transform Spectrometers," Applied Optics, Dec. 20, 2008, pp. 6889-6894, vol. 47, No. 36.

Skinner, B. J. et al., "Matched FSK/PSK Radar," IEEE Proceedings, 1994 National Radar Conference, Mar. 1994, pp. 251-255, Atlanta, GA.

Freeman, J. et al., "Gain Modulation Response of Erbium-Doped Fiber Amplidiers," IEEE Photonics Technology Letters, Feb. 1993, pp. 224-226, vol. 5, No. 2.

Murota, Kazuaki et al., "GMSK Modulation for Digital Mobile Radio Telephony," IEEE Transactions on Communications, Jul. 1981, pp. 1044-1050, vol. 29, No. 7.

Whittaker, E.T. et al., "A Course of Modern Analysis" 1965, p. 462-463, Cambridge University Press, 4th Edition, Cambridge, UK.

Campbell, Joel, "The SMM Model as a Boundary Value Problem Using the Discrete Diffusion Equation," Theor. Popul. Biol., 2007, pp. 539-546, vol. 72, Issue 4.

Campbell, Joel, "Ground State Energy for the Hartree-Fock Equations with Dirichlet Boudnary Conditions," J. Math. Phys., Apr. 1994, pp. 1471-1486, vol. 35, No. 4.

Benedetto, John J. et al., "Sampling Multipliers and the Poisson Summation Formula," J. Fourier Anal. Appl. Nov. 5, 1997, pp. 505-523, vol. 3, No. 5.

Kameyama, Shupei et al., "Performance Improvement and Analysis of a 1.6 um Continuous-wave modulation Laser Absorption Spectrometer System for CO2 Sensing," Applied Optics, Apr. 10, 2011, pp. 1560-1569, vol. 50, No. 11.

Kameyama, Shupei, et al., "Development of 1.6 um Continuous-wave Modulation Hard-target Differential Absorption Lidar System for CO2 Sending" Optics Letters, May 15, 2009, pp. 1513-1515, vol. 34, No. 10.

Takeuchi, N. et al., "Random Modulation CW Lidar," Applied Optics, May 1, 1983, pp. 1382-1386, vol. 22, No. 9.

Rybaltowski, Adam et al., "Signal-to-noise Ratio in Direct-detection Mid-infrared Random-Modulation Continuous-Wave Lidar in the Presence of Colored Additive Noise," Optics Express, Oct. 8, 2001, pp. 386-399, vol. 9, No. 8.

Rybaltowski, Adam et al., "New Modulation Sequence for Random-Modulation Continuous-Wave Lidar," Proceedings of SPIE, 2002, pp. 216-223, vol. 4484.

(56) References Cited

OTHER PUBLICATIONS

Rybaltowski, Adam et al., "Figure of Merit and Fundamental Range Limitations in Surface Sensing Direct-detection Mid-infrared Random-Modulation Continuous-Wave Lidar," Proceedings of SPIE, 2002, pp. 32-36, vol. 4546.

Rybaltowski, Adam et al., "Superior Signal-to-noise Ratio of a New AA1 Sequence for Random-modulation Continous-wave Lidar," Optics Letters, Aug. 1, 2004, pp. 1709-1711, vol. 29, No. 15.

Takeuchi, Nobuo et al., "Diode-laser Random-modulation CW Lidar," Applied Optics, Jan. 1, 1986, pp. 63-67, vol. 25, No. 1.

Zahradnik, Pavel et al., "Analytical Design of 2-D Narrow Bandstop FIR Filters," Computational Science—ICCS 2004, pp. 56-63, vol. 3039.

Orfandis, Sophocles, "Lecture Notes on Elliptic Filter Design," Rutgers University, Nov. 20, 2005, pp. 1-42.

Chouikha, A., "On properties of elliptic Jacobi functions and applications," Journal of Nonlinear Mathematical Physics, 2005, pp. 162-169, vol. 12, No. 2.

Campbell, Joel et al., "Advanced sine wave modulation of continuous wave laser system for atmospheric CO2 differential absorption measurements," Applied Optics, 2014, pp. 816-829, vol. 53, No. 5.

WolframMathWorld. "Jacobi Elliptic Functions." http://mathworld.wolfram.com/JacobiEllipticFunctions.html, Jun. 1, 2015, Accessed Jan. 26, 2016.

WolframResearch. "Introduction to the incomplete elliptic integrals." http://functions.wolfram.com/EllipticIntegrals/EllipticE2/introductions/IncompleteEllipticIntegrals/ShowAll.html, Jun. 1, 2015, Accessed Jan. 26, 2016.

Snape, Jamie, "Applications of Elliptic Functions in Classical and Algebraic Geometry." Dissertation, University of Durham, Durham, UK, 2004, pp. 1-117.

Lin, Bing, et. al., "Modeling of intensity-modulated continuous-wave laser absorption spectrometer systems for atmospheric CO2 column measurements," Applied Optics, 2013, pp. 7062-7077, vol. 52, No. 29.

Campbell, J. et. al. "Pseudorandom noise code-based technique for thin-cloud discrimination with CO2 and O2 absorption measurements," Optical Engineering, Nov. 18, 2011, pp. 126002-126002, vol. 50, No. 12.

Space Studies Board. "Earth Science and Applications from Space: National Imperatives for the Next Decade and Beyond, Blending Earth Observations and Models—The Successful Paradigm of Weather Forecasting" Meas. Sci. Technol., 2000, pp. 392-397, No. 11, National Academies Press, UK.

Pougatchev, N., et. al., "Advanced technologies high resolution Fourier transform spectrometer for atmospheric studies," Aerospace Conference Proceedings (IEEE), 2000, pp. 237-243, vol. 3.

Campbell, J., et. al., "Binary Phase Shift Keying on Orthogonal Carriers for Multi-Channel CO2 Absorption Measurements in the Presence of Thin Clouds," Applied Optics, Oct. 15, 2014, pp. A1634-A1640, vol. 22, No. 106.

Obland, M., et. al., "Technology advancement for the ASCENDS mission using the ASCENDS CarbonHawk Experiment Simulator (ACES)", 2013 AGU Fall Meeting, San Francisco, CA, Dec. 9-13, 2013.

Nohorai, Arye, et. al., "Adaptive comb filtering for harmonic signal enhancement", Acoustics, Speech and Signal Processing, IEEE Transactions on, 1986, pp. 1124-1136, vol. 34, No. 5.

Campbell, J., et. al., "High Resolution CW Lidar Altimetry using Repeating Intensity Modulated Waveforms and Fourier Transform Reordering," Optics Letters, 2014, pp. 6078-6081, vol. 39, No. 20.

Lucy, L., "An iterative technique for the rectification of observed images," The Astronomical Journal, 1974, pp. 745-754, vol. 79.

\* cited by examiner

BINARY PHASE SHIFT KEYING (BPSK) ON ORTHOGONAL CARRIERS FOR MULTI-CHANNEL IM-CW CO2 ABSORPTION OR LIDAR/RADAR/SONAR MAPPING APPLICATIONS

CROSS-REFERENCE TO RELATED PATENT APPLICATIONS

This patent application claims the benefit of and priority to U.S. provisional patent application No. 62/052,608, titled "Binary Phase Shift Keying (BPSK) On Orthogonal Carriers for Multi-Channel IM-CW CO2 Absorption or Lidar/Radar/Sonar Mapping Applications", filed on Sep. 19, 2014. The entire contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Intensity Modulated Continuous Wave ("IM-CW") Light detection and ranging ("Lidar") is a sensing technology using light waves to perform differential absorption measurements and/or to determine a distance to objects. Radio detection and ranging ("Radar") is a sensing technology using radio waves to determine a distance to objects. Sound Navigation and Ranging ("Sonar") is a sensing technology using sound waves to determine a distance to objects. In CW Lidar, Radar, or Sonar systems, a wide band signal (e.g., light, radio, or sound waves, respectively), may be transmitted toward an object and the signal reflecting off that object may be received by the CW Lidar, Radar, or Sonar system.

BRIEF SUMMARY OF THE INVENTION

The systems, methods, and devices of the present invention use a single Pseudo Noise (PN) code to modulate multiple orthogonal carriers by Binary Phase Shift Keying (BPSK) modulation. The various embodiments enable closely spaced carriers to be modulated with the same periodic PN sequence using BPSK modulation. In this manner, even though the carriers may almost entirely share bandwidth, orthogonality of the carriers may not be lost, enabling the various embodiments to be used with limited bandwidth Intensity Modulated Continuous Wave (IM-CW) Light detection and ranging (Lidar), Radio detection and ranging (Radar), or Sound Navigation and Ranging (Sonar) systems. Additionally, by using orthogonal carriers the various embodiments enable measurements to be made simultaneously, thereby reducing the error compared to systems that require sequential measurements, such as pulsed Lidar systems.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
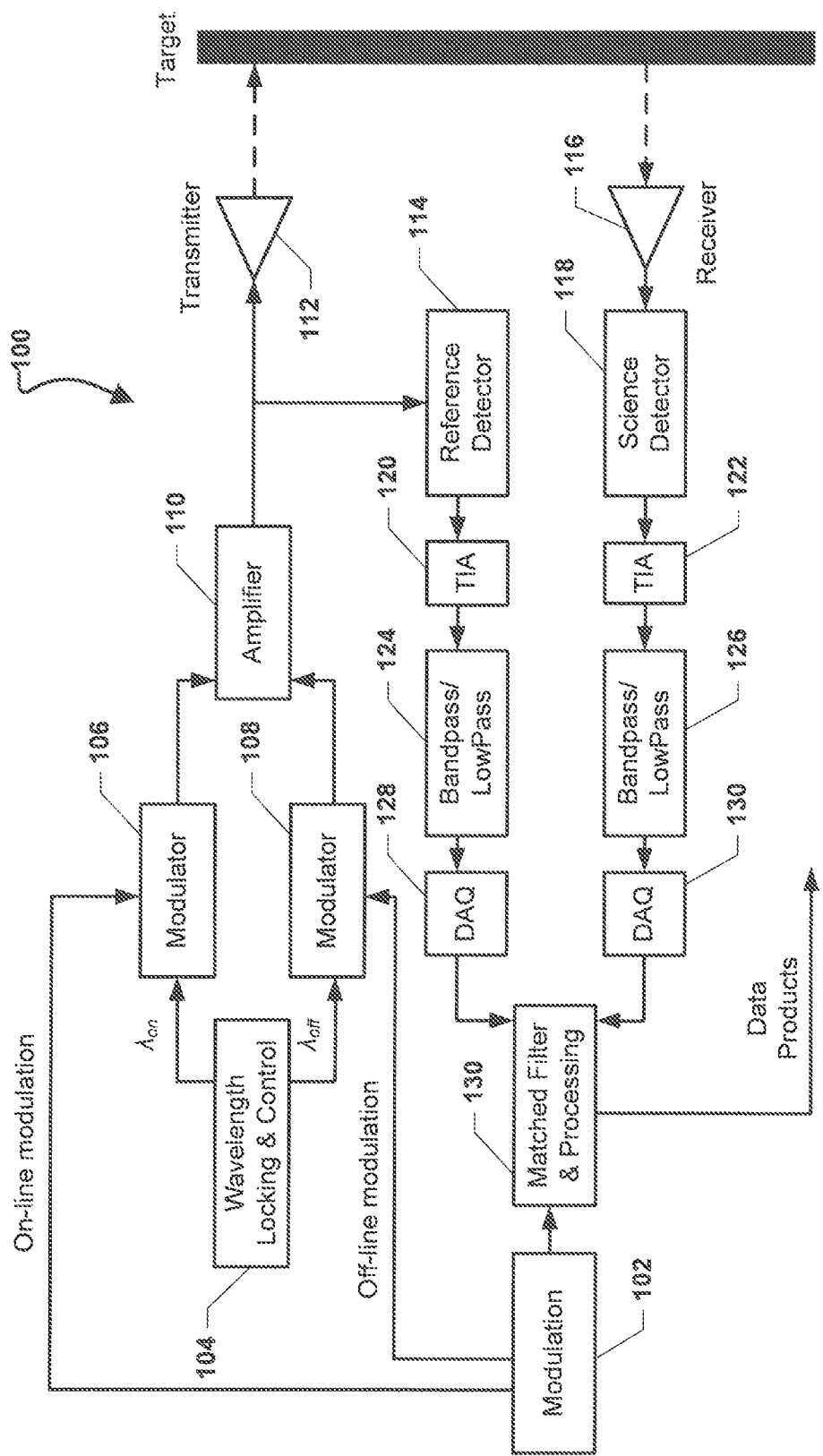
FIG. 1 is system block diagram of an example system (e.g., a IM-CW Lidar, a Radar, or a Sonar system) suitable for use with the various embodiments.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various methods have been described for performing differential absorption measurements and/or Light detection and ranging (Lidar) mapping, including the techniques disclosed in U.S. patent application Ser. No. 14/072,019, incorporated herein by reference in its entirety, based on using a Pseudo Noise (PN) code (or filtered PN code) to modulate a sine wave carrier to perform ranging and/or differential absorption measurements. In U.S. patent application Ser. No. 14/072,019, orthogonality between channels in the multichannel case is achieved by time shifting the PN code. Another method for performing optical property measurements is described in U.S. Pat. No. 7,995,917, incorporated herein by reference in its entirety, in which multiple orthogonal PN codes are used to modulate a single carrier signal. The method described in U.S. Pat. No. 7,995,917 is difficult to implement in real world systems because it is difficult to generate orthogonal PN codes and autocorrelation codes at the same time. A still further method for performing differential absorption measurements is described in U.S. Pat. No. 7,361,922, incorporated herein by reference in its entirety, in which two different wavelength carriers with different absorption coefficients are modulated by a PN series.

However, the various embodiments of the present invention use a different method to achieve orthogonality between channels by creating orthogonally closely spaced carriers and modulating the carriers with the same periodic PN sequence. The systems, methods, and devices of the present invention use a single PN code to modulate multiple orthogonal carriers by Binary Phase Shift Keying (BPSK) modulation. The various embodiments enable closely spaced carriers to be modulated with the same periodic PN sequence using BPSK modulation. In this manner, even though the carriers may almost entirely share bandwidth, orthogonality of the carriers may not be lost, enabling the various embodiments to be used with limited bandwidth Intensity Modulated Continuous Wave (IM-CW) Lidar, Radio detection and ranging (Radar), or Sound Navigation and Ranging (Sonar) systems. Additionally, by using orthogonal carriers the various embodiments enable measurements to be made simultaneously, thereby reducing the error compared to systems that require sequential measurements, such as pulsed Lidar systems.

FIG. 1 is system block diagram of an example system 100 (e.g., a CW Lidar, a Radar, or a Sonar system) suitable for use with the various embodiments. A modulation module 102 may output on-line modulation and off-line modulation to modulators 106 and 108, respectively. The modulation module 102 may also output indications of the modulation used to the matched filter and processing module 130. A wavelength and locking control module 104 may provide signals to the modulators 106 and 108, respectively. In an embodiment, one or more of the modulation module 102, matched filter and processing module 130, and/or wavelength and locking control module 104 may be modules of and/or controlled by a processor of a computing device. A wide band modulation signal may be used to modulate the intensity of a narrow linewidth output, such as a narrow linewidth seed laser. The modulated signal may be amplified by the amplifier 110 and output via the transmitter 112.

The transmitted signal (e.g., light, radio waves, sound, etc.) is reflected off the target and received by the receiver 116 (e.g., telescope, transducer, antenna, etc.) and science detector 118. The signal may also be sent to the reference detector 114 to normalize out any energy fluctuations (e.g., laser energy fluctuations) from the return signal. A series of transimpedance amplifiers 120, 122, filters 124, 126, and analog to digital converts 128, 130, respectively, digitize the transmitted (i.e., reference signal) sent to the reference detector 114 and the received signal from the science detector 118 and provide the signals to the matched filter and processing module 130. The digitized received signal and reference signal are then used for post processing, such as to determine absorption powers and range estimates by the filter and processing module.

While FIG. 1 illustrates the a single transmitter, in a multi-channel ranging application multiple transmitters, such as multiple lasers in a multi-channel ranging Lidar system, pointed in multiple directions at one time may transmit signals and the reflected signals may be received by the single receiver all at once. Correlations with the orthogonal reference signals may be used to separate out each direction from the received signals one at a time. Such a multi-channel ranging system may be applicable to Lidar, Radar, or Sonar mapping.

In a specific implementation, the system 100 shown in FIG. 1 may be a IM-CW Lidar system for $CO_2$ Integrated Path Differential Absorption (IPDA) measurements. Amplitude modulated online and offline seed lasers with good spectral properties are optically combined using fiber optics and used to simultaneously seed a single Erbium Doped Fiber Amplifier (EDFA) 110 to increase the transmitted power. A small fraction of the transmitted beam is picked off via an optical tap inside of the EDFA 110 and sent to a reference detector 114 for energy normalization. The backscattered science signal from the online and offline wavelengths from the surface as well as aerosols and clouds are simultaneously collected with a telescope 116, optically filtered with a narrow band optical filter, and detected by a single detector. Both the science and reference signals are amplified, electronically filtered and then digitized for retrievals of column CO2. Post processing of the digitized science and reference data allow for discrimination between ground and intermediate scatterers using the matched filter technique, and also to obtain differential absorption power ratios for inference of CO2 column amounts as well as range estimates to the scattering targets. The on-line and off-line laser modulation signals using the time shifted approach can be expressed as:

$$\Lambda_{off} = 1 + m\sigma_{off}(t), \Lambda_{on} = 1 + m\sigma_{on}(t) \quad (1)$$

Where m is the modulation index with a value between 0 and 1, and $\sigma(t)$ is the repeating modulation waveform where $-1 \leq \sigma(t) \leq 1$, $<\sigma(t)> = 0$, and $\Delta t$ is the time shifting of on-line modulation waveform related to that of off-line. In general, $\Delta t > 2r_{max}/c$ may be selected to avoid interference between the time shifted channel and intermediate scatterers, where $r_{max}$ is the maximum distance among potential scatterers including the Earth's surface and is also called unambiguous range, while c is the speed of light.

Given the modulation waveforms presented in Equation 1, the instantaneous received Lidar off-line and on-line received optical powers ($P_{off}^R(t)$ and $P_{on}^R(t)$, respectively) from a single scattering target (i.e., the surface) at range r are given by:

$$P_{off}^R(t) = \frac{K}{r^2} \overline{P_{off}^T} \exp\left(-2\varepsilon \int_0^r \beta(r')dr'\right) \exp(-2\tau)(1 + m\sigma_{off}(t - 2r/c)), \quad (2)$$

$$P_{on}^R(t) = \frac{K}{r^2} \overline{P_{on}^T} \exp\left(-2\varepsilon \int_0^r \beta(r')dr'\right) \exp(-2\tau)\exp(-2\tau')(1 + m\sigma_{on}(t - 2r/c))$$

Where $\tau$ is the total one-way column optical depth for the off-line measurement that is determined by the gas absorption from molecules other than $CO_2$, and $\tau'$ is the one-way column optical depth resulting from $CO_2$ absorption only, $\beta$ is the backscatter coefficient ($km^{-1}sr^{-1}$), $\varepsilon$ is the extinction to backscatter ration ($sr^{-1}$), L, is a constant, and where $\overline{P_{off}^T}$ and $\overline{P_{on}^T}$ are the average transmitted on-line and off-line powers over one period of the modulation waveform, respectively.

When multiple targets including the surface exist in the Lidar path length, each target would generate similar received Lidar signals like those in Equation 2. The signals from these multiple targets are combined at the detector and converted to an electronic signal S(t). For an AC coupled received subsystem, the signal may be $$S(t) = \Sigma[C_{1k}m\sigma_{on}(t-2r_k/c) + C_{2k}m\sigma^{off}(t-2r_k/c)] \quad (3)$$

Where the overall k scatterers may be summed, and where $$C_{1k} = \frac{K'_k}{r^2}\overline{P^T_{on}}\exp\left(-2\tau\int_0^{r_k}\beta(r')dr'\right)\exp(-2\tau_k)\exp(-2\tau'_k), \quad (4)$$

$$C_{2k} = \frac{K'_k}{r^2}\overline{P^T_{off}}\exp\left(-2\varepsilon\int_0^{r_k}\beta(r')dr'\right)\exp(-2\tau_k)$$

where K' is a constant. These $C_{1k}$ and $C_{2k}$ returns can be uniquely discriminated from other returns from different scatterers using the matched filter with the transmitted waveform. These are also proportional to the average received optical power $\overline{P_{off,k}^R}$ and $\overline{P_{on,k}^R}$ from the kth scatterer. For a ground target solving for $\tau_g'$ gives $$\tau'_g = \frac{1}{2}\ln\left(\frac{C_{2g}\overline{P^T_{on}}}{C_{1g}\overline{P^T_{off}}}\right) \equiv \frac{1}{2}\ln\left(\frac{P^R_{off,g}\overline{P^T_{on}}}{P^R_{on,g}\overline{P^T_{off}}}\right) \quad (5)$$

Where $C_{1g}$ and $C_{2g}$ are the ground returns. Once $C_{1g}$ and $C_{2g}$ are determined, the column optical depth for $CO_2$ can be found using Equation 5. In general, this is done by cross correlating the reference waveform with the return signal S(t), i.e., by the matched filter technique as mentioned above. This results in multiple peaks for the multiple scatterers including the surface. The ground return can be identified through range gating (or maximum range). By choosing the reference modulation waveforms with perfect autocorrelation properties (ML sequence for instance), channel separation is achieved through the time shifting approach since each channel correlates at a different apparent range without interference between channels or scatterers. That is, each scatterer results in two peaks in its matched filter output: one for the off-line returns, and the other for on-line returns with the Δt shifted time.

The various embodiments may present an improved modulation approach for CO2 IPDA measurements. In an embodiment method an IM sine wave carrier may be modulated by a Maximum Length (ML)-sequence as in Equation 6 below. To effectively represent each bit of the ML-sequence in the transmitted waveforms, and allow flexibility in the unambiguous range for a particular code length and sample rate, the ML-sequence may be oversampled by an integer M such that each code bit of the ML-sequence is represented by M points. Let $z_n \equiv z(n)$ be the original ML-sequence and $Z_n \equiv Z(n)$ be the oversampled ML-sequence such that $Z(n) = z(\text{int}((n-1)/M)+1)$, where int(x) is a function that represents the integer part of x.

In the case of BPSK modulation, the modulation waveform takes one of two forms for the on-line and off-line channels.

$$\sigma_{on}(n) = (2Z(n)-1)\cos(2\pi n f_{on}/f_s),$$

$$\sigma_{off}(n) = (2Z(n)-1)\cos(2\pi n f_{off}/f_s) \quad (6)$$

Where $f_{on}$ is the on-line carrier frequency, $f_{off}$ is the off-line carrier frequency, and $f_s$ is the sample rate. More than two channels may be used for different applications. Orthogonal frequency signals may be chosen with the center frequency as the desired parameter for a BPSK signal. Assuming there are exactly P repeats of the ML-sequence in a frame of N points where the period of each repeat is τ. The center frequency of K orthogonal channels will take the form $$f_{01} = \frac{n_1}{2P\tau'}, \quad (7)$$

$$f_{02} = \frac{n_2}{2P\tau'},$$

$$\ldots,$$

$$f_{0K} = \frac{n_K}{2P\tau}$$

Not every choice of $n_k$ will lead to orthogonal frequencies but the ones that are orthogonal will take that form. The demodulation is performed in quadrature by choosing the reference signal as one of two forms. The first is the clear sky case where there are no known clouds. This has the best SNR, but as a background offset. This does not present a problem unless there are multiple scatterers.

$$\Gamma_{on}(n) = (2Z(n)-1)\exp(2\pi i n f_{on}/f_s),$$

$$\Gamma_{off}(n) = (2Z(n)-1)\exp(2\pi i n f_{off}/f_s) \quad (8)$$

The second form is the cloudy sky case which has the advantage of a perfectly 0 background offset, but with an SNR that is not as good. This SNR reduction ranges from a maximum factor 0.707 to about 1.0 depending on the type of noise. In this case $$\Gamma'_{on}(n) = Z(n)\exp(2\pi i n f_{on}/f_s),$$

$$\Gamma'_{off}(n) = Z(n)\exp(2\pi i n f_{off}/f_s) \quad (9)$$

Demodulation is accomplished simply by taking the magnitude of the correlation described by $$R(ref, data) = \quad (10)$$

$$\frac{1}{N}\sum_{m=0}^{N-1} ref^*(m)data(m+n) = DFT^{-1}(DFT^*(ref^*)DFT(data))$$

where "*" denotes the complex conjugate, and N is the length of oversampled ML-sequence, ref is the reference signal and data is the digitized received signal from the receiver of the CW Lidar, Radar, or Sonar system.

Figure 2:
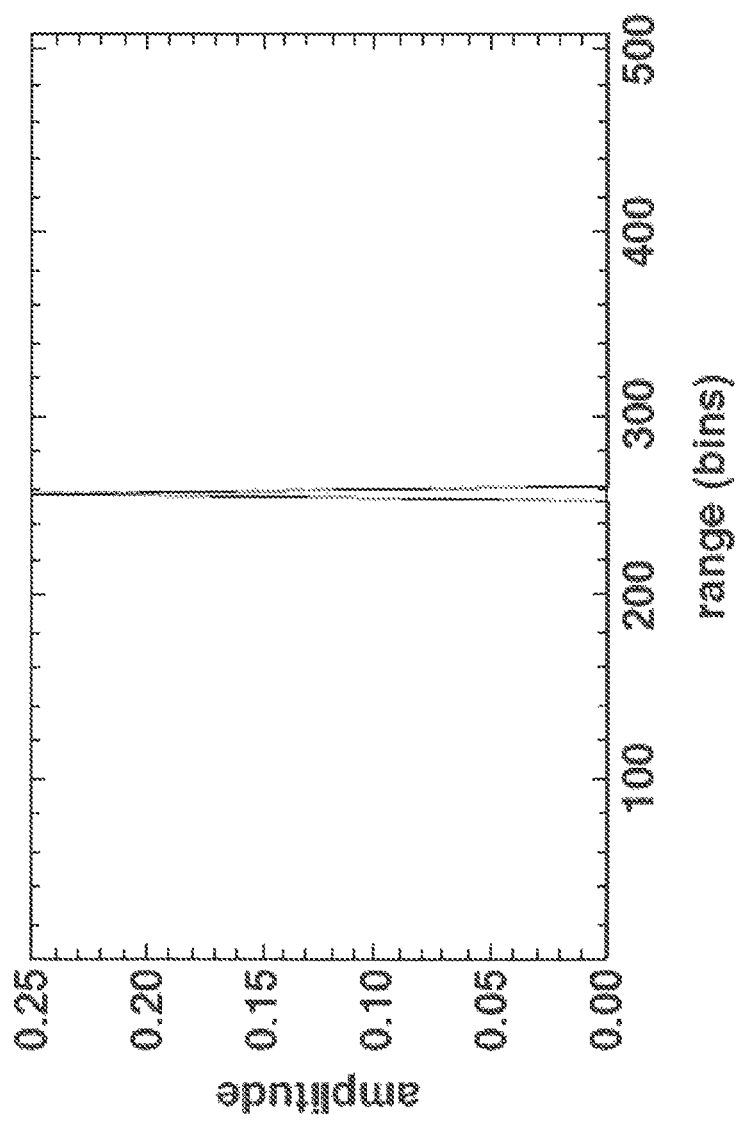
FIG. 2 is a graph of an autocorrelation function using the cloudy sky BPSK reference waveform according to an embodiment.

As an example of a modulation technique that is suitable for a band pass filtered Laser Absorption Spectrometer system, such as that described above with reference to FIG. 1, take the special case where P=16 (16 ML sequence repeats) and M=4 (4 samples per code bit) with a 2 MHz sample rate. An 7th order (or 127 length) ML-sequence may be generated using the recurrence relation $z_{n+7} = z_n \oplus z_{n+6}$ with the seed {1, 0, 1, 0, 1, 1, 1}, where ⊕ is the "exclusive or". Note that each waveform in this and all subsequent plots are plotted with 8 samples per code bit with linear interpolation between points. An example of a 6-channel system that is mutually orthogonal using a frame size of 8128 (16, 127×4 point ML-sequence repeats) would be to select center frequencies of {225125/508 kHz, 56875/127 kHz, 230125/508 kHz, 232625/508 kHz, 117625/254 kHz, 237625/508 kHz}. These are displayed as integer ratios so they may be computed in a more exact fashion and produce perfectly orthogonal BPSK waveforms. A plot of the autocorrelation function (cloudy sky case) is shown in FIG. 2.

While a specific implementation of a IM-CW Lidar system for $CO_2$ Integrated Path Differential Absorption (IPDA) measurements having on-line and off-line channels is discussed above with reference to Equations 1-10, the discussions of multi-channel absorptions and on-line and off-line channels are provided merely as examples to better illustrate aspects of the various embodiments. Other systems, such as multi-channel ranging systems with two or more orthogonal channels (e.g., a first channel $\sigma_{first}(n)$, second channel $\sigma_{second}(n)$, etc.) may be substituted in the discussions of multi-channel absorptions and on-line and off-line channels and Equations 1-10 above without departing from the spirit or scope of the invention.

Figure 3:
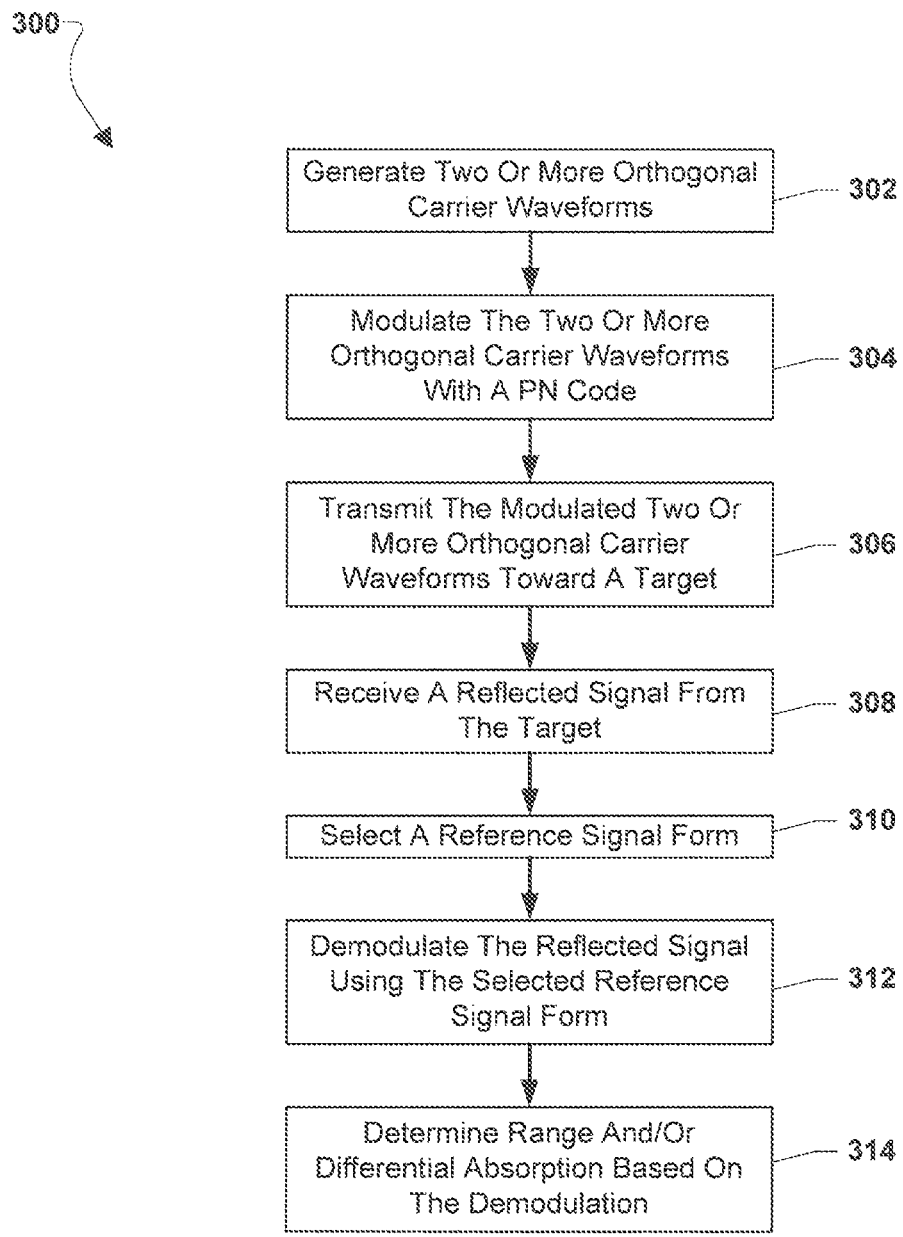
FIG. 3 is a process flow diagram illustrating an embodiment method for modulating orthogonal carrier waveforms with a PN code.

FIG. 3 is a process flow diagram illustrating an embodiment method 300 for modulating orthogonal carrier waveforms with a PN code. In an embodiment, the operations of method 300 may be performed by the processor of a computing device, such as a computing device of a Lidar, Radar, or Sonar system.

In block 302 the processor may generate two or more orthogonal carrier waveforms. In block 304 the processor may modulate the two or more orthogonal carrier waveforms with a single PN code, such as the ML-sequence. For example, the modulated carrier waveforms may take the form of Equation 6 discussed above. In block 306 the processor may transmit the modulated two or more orthogonal carrier waveforms toward a target. For example, the modulated orthogonal carrier waveforms may be combined and transmitted toward a target.

In block 308 the processor may receive a reflected signal from the target. In block 310 the processor may select a reference signal form. For example, based on there being a clear sky case, the reference signal form selected may be that of Equation 8 discussed above or for a cloudy sky case, the reference signal form selected may be that of Equation 9 discussed above. In block 312 the processor may demodulate the reflected signal using the selected reference signal form. For example, demodulation may be performed by taking the magnitude of correlation described by Equation 9 discussed above. In block 314 the processor may determine range and/or differential absorption based on the demodulation.

Flight Testing

Figure 4:
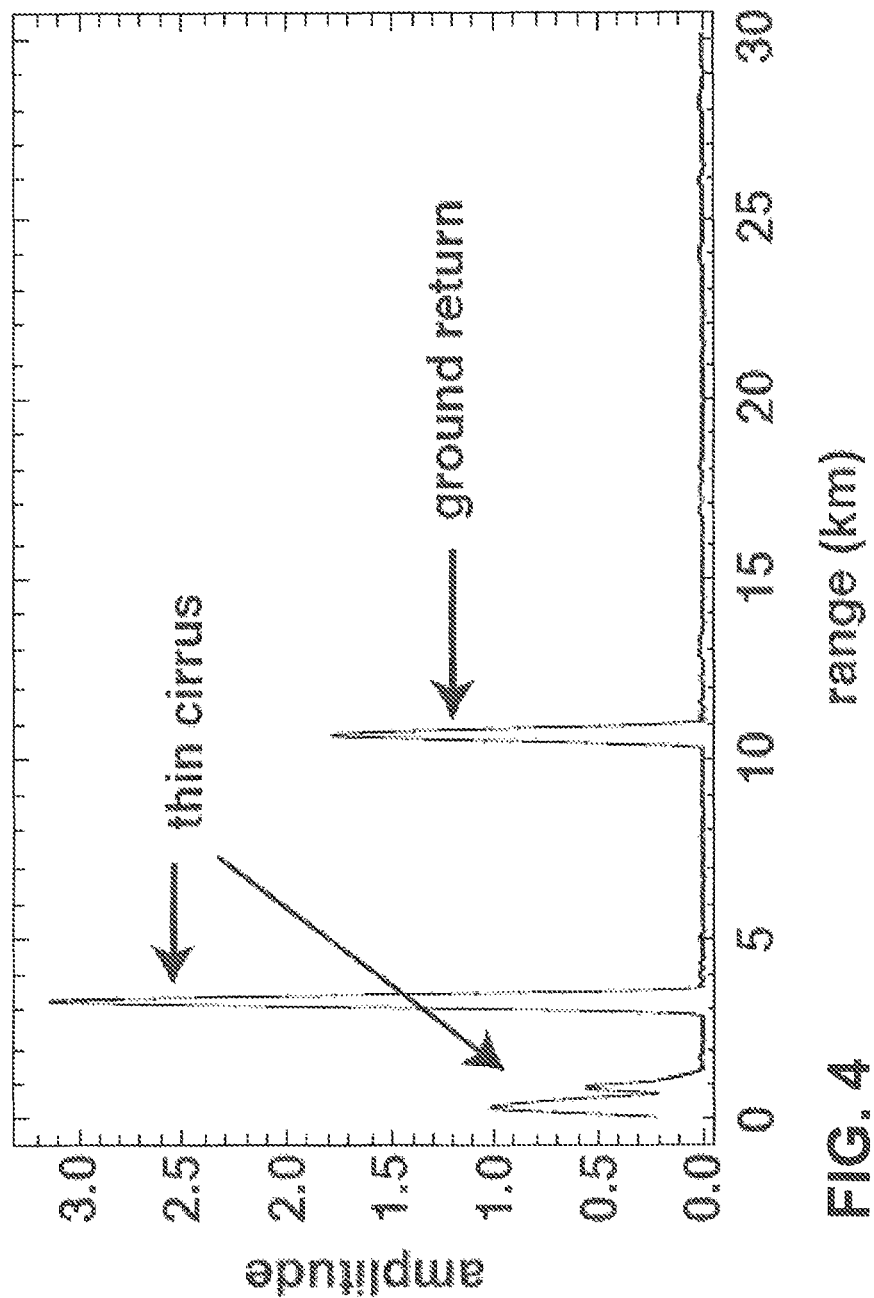
FIG. 4 is a graph of the range profile from aircraft measurements through clouds at 11 km altitude using 203200 point frames according to an embodiment.
Figure 5:
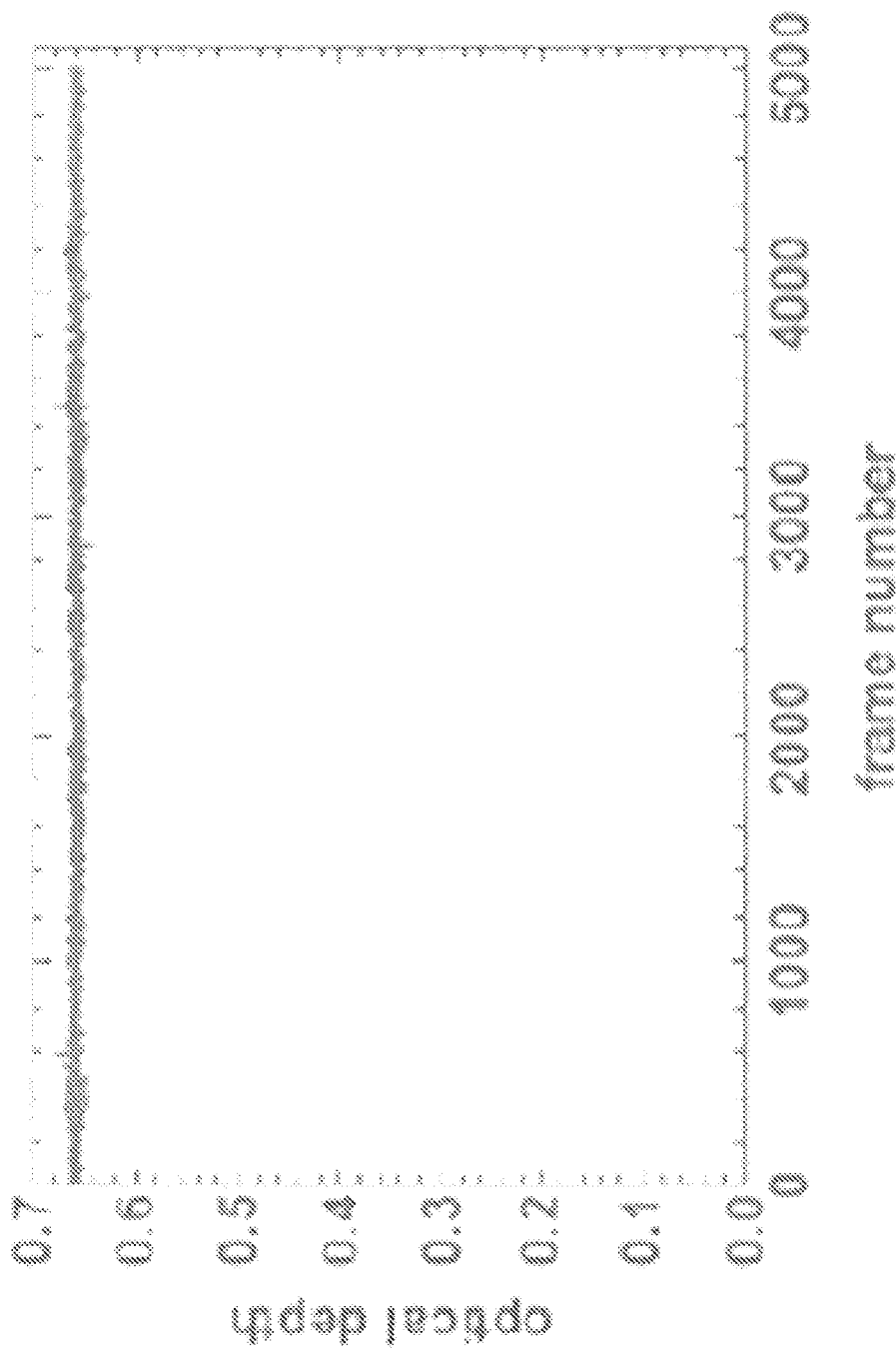
FIG. 5 is graph of optical depth measurements for a clear sky case at 11 km altitude using 203200 point frames according to an embodiment with an optical depth SNR of about 500 using 1 second averages.

These waveforms were recently tested in flight and performed very well as expected. There was no side lobe interference from clouds as one has in the linear swept frequency case and the optical depth SNR was comparable to previous tests. FIG. 4 shows the ability to transmit through multiple clouds without side lobe interference at all. FIG. 5 shows the optical depth for a clear sky case flying at 11 km. Optical depth SNR is approximately 500 for 1 second averages and is comparable with previous experiments using linear swept frequency.

Figure 6:
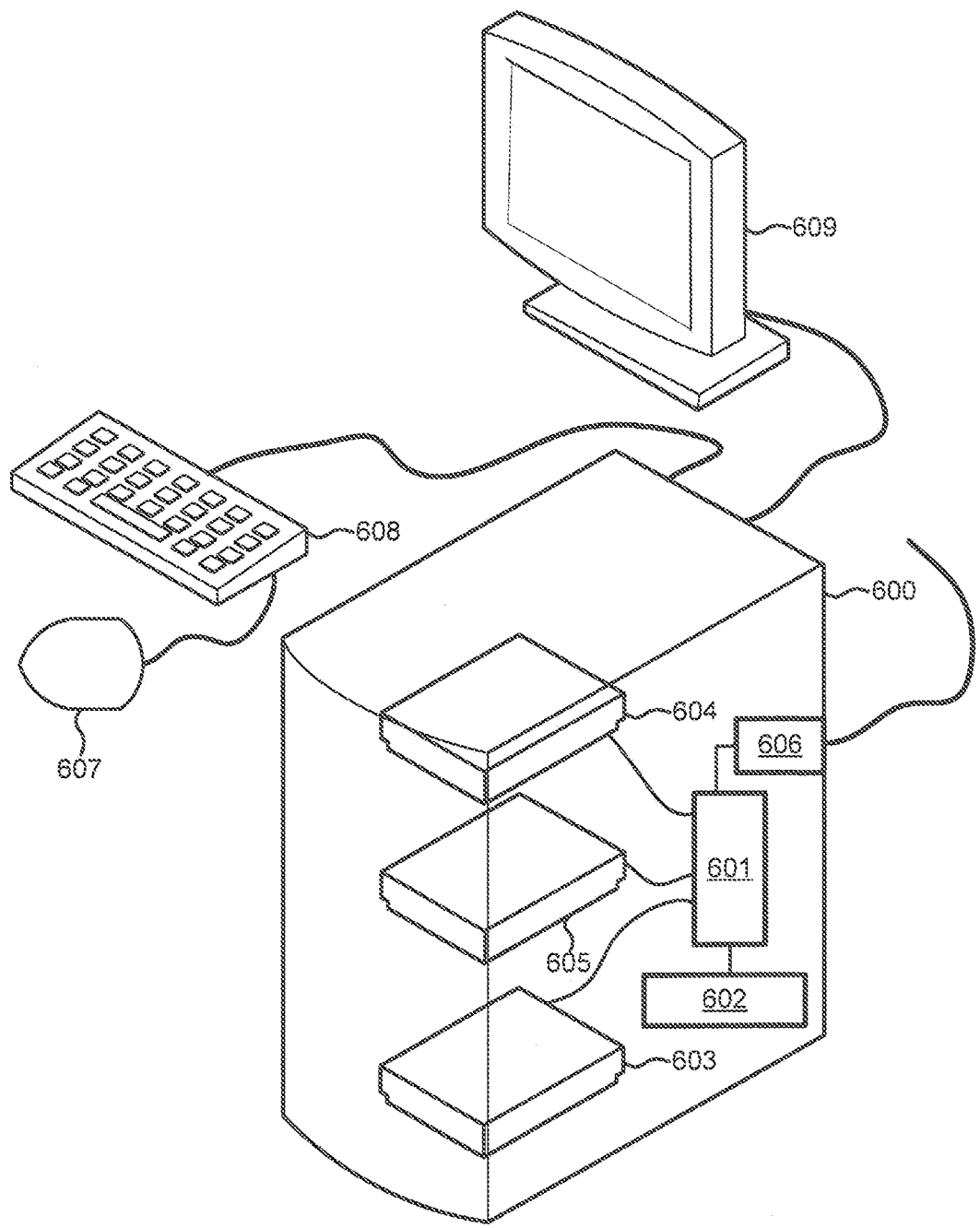
FIG. 6 is a component block diagram of a computing device suitable for use with the various embodiments.

The various embodiments may be implemented in any of a variety of computing devices, an example of which is illustrated in FIG. 6. A computing device 600 will typically include a processor 601 coupled to volatile memory 602 and a large capacity nonvolatile memory, such as a disk drive 605 of Flash memory. The computing device 600 may also include a floppy disc drive 603 and a compact disc (CD) drive 604 coupled to the processor 601. The computing device 600 may also include a number of connector ports 606 coupled to the processor 601 for establishing data connections or receiving external memory devices, such as a USB or FireWire® connector sockets, or other network connection circuits for coupling the processor 601 to a network or bus. The computing device 600 may also include the trackball 607, keyboard 608 and display 609 all coupled to the processor 601.

The processor 601 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 602 and/or 605 before they are accessed and loaded into the processor 601. The processor 601 may include internal memory sufficient to store the application software instructions. In many devices the internal memory may be a volatile or nonvolatile memory, such as flash memory, or a mixture of both. For the purposes of this description, a general reference to memory refers to memory accessible by the processor 601 including internal memory or removable memory plugged into the device and memory within the processor 601 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for generating a modulation waveform in a ranging system, comprising:
    generating two or more orthogonal carrier waveforms;
    modulating the two or more orthogonal carrier waveforms with a Pseudo Noise (PN) code;
    combining the modulated two or more orthogonal carrier waveforms to produce a combined waveform;
    transmitting the combined waveform toward a target;
    receiving a reflected signal from the target;
    selecting a reference signal form;
    demodulating the reflected signal using the selected reference signal form;
    determining at least one of a range and differential absorption of the target based on the demodulation; and
    wherein the PN code is the Maximum Length (ML)-sequence having P repeats;
    wherein the period of each repeat is $\tau$; and
    wherein the two or more orthogonal carrier waveforms have respective center frequencies equal to a respective mutually exclusive integer divided by $2P\tau$.

2. The method of claim 1, wherein the ML-sequence is oversampled.

3. The method of claim 2, wherein the modulated two or more orthogonal carrier waveforms take on the form for the first channel $\sigma_{first}(n)$ and second channel $\sigma_{second}(n)$ of:

$$\sigma_{first}(n)=(2Z(n)-1)\cos(2\pi n\, f_{first}/f_s),$$

$$\sigma_{second}(n)=(2Z(n)-1)\cos(2\pi n\, f_{second}/f_s),$$

wherein $Z(n)$ is the oversampled ML-sequence, $f_{first}$ is the first carrier frequency, $f_{second}$ is the second carrier frequency, $f_s$ is the sample rate.

4. The method of claim 3, wherein the reference signal $\Gamma(n)$ form is:

$$\Gamma_{first}(n)=(2Z(n)-1)\exp(2\pi i n\, f_{first}/f_s),$$

$$\Gamma_{second}(n)=(2Z(n)-1)\exp(2\pi i n\, f_{second}/f_s).$$

5. The method of claim 3, wherein the reference signal $\Gamma(n)$ form is:

$$\Gamma'_{first}(n)=Z(n)\exp(2\pi i n\, f_{first}/f_s),$$

$$\Gamma'_{second}(n)=Z(n)\exp(2\pi i n\, f_{second}/f_s).$$

6. The method of claim 3, wherein the first channel is the on-line channel and the second channel is the off-line channel.

7. The method of claim 1, wherein the ranging system is a Lidar system, Radar system, or Sonar system.

8. The method of claim 1, wherein the modulating of the two or more orthogonal carrier waveforms modulates the two or more orthogonal carrier waveforms with the same Pseudo Noise (PN) code.

9. A system, comprising:
    A ranging system; and
    a computing device connected to the ranging system, the computing device comprising a processor configured with processor executable instructions to perform operations comprising:
    generating two or more orthogonal carrier waveforms;
    modulating the two or more orthogonal carrier waveforms with a Pseudo Noise (PN) code;
    combining the modulated two or more orthogonal carrier waveforms and transmitting the combined two or more orthogonal carrier waveforms toward a target;
    receiving a reflected signal from the target;
    selecting a reference signal form;
    demodulating the reflected signal using the selected reference signal form; and
    determining at least one of a range and differential absorption of the target based on the demodulation; and
    wherein the PN code is the Maximum Length (ML)-sequence having P repeats;
    wherein the period of each repeat is $\tau$; and
    wherein the two or more orthogonal carrier waveforms have respective center frequencies equal to a respective mutually exclusive integers divided by $2P\tau$.

10. The system of claim 9, wherein the ML-sequence is oversampled.

11. The system of claim 9, wherein the ranging system is a Lidar system, Radar system, or Sonar system.

12. A system, comprising:
    a ranging system; and
    a computing device connected to the ranging system, the computing device comprising a processor configured with processor executable instructions to perform operations comprising:
    generating two or more orthogonal carrier waveforms;
    modulating the two or more orthogonal carrier waveforms with a Pseudo Noise (PN) code;
    transmitting the modulated two or more orthogonal carrier waveforms toward a target;
    receiving a reflected signal from the target;
    selecting a reference signal form;

demodulating the reflected signal using the selected reference signal form; and determining at least one of a range and differential absorption of the target based on the demodulation;

wherein PN code is the Maximum Length (ML)-sequence;

wherein the ML-sequence is oversampled; and wherein the modulated two or more orthogonal carrier waveforms take on the form for the first channel $\sigma_{first}(n)$ and second channel $\sigma_{second}(n)$ of:

$$\sigma_{first}(n)=(2Z(n)-1)\cos(2\pi n\, f_{first}/f_s),$$

$$\sigma_{second}(n)=(2Z(n)-1)\cos(2\pi n\, f_{second}/f_s),$$

wherein $Z(n)$ is the oversampled ML-sequence, $f_{first}$ is the first carrier frequency, $f_{second}$ is the second carrier frequency, $f_s$ is the sample rate.

13. The system of claim 12, wherein the reference signal $\Gamma(n)$ form is:

$$\Gamma_{first}(n)=(2Z(n)-1)\exp(2\pi i n\, f_{first}/f_s),$$

$$\Gamma_{second}(n)=(2Z(n)-1)\exp(2\pi i n\, f_{second}/f_s).$$

14. The system of claim 12, wherein the reference signal $f(n)$ form is:

$$\Gamma'_{first}(n)=Z(n)\exp(2\pi i n\, f_{first}/f_s),$$

$$\Gamma'_{second}(n)=Z(n)\exp(2\pi i n\, f_{second}/f_s).$$

15. The system of claim 12, wherein the first channel is the on-line channel and the second channel is the off-line channel.

\* \* \* \* \*